United States Patent [19]

Briffod

[11] Patent Number: 5,858,136
[45] Date of Patent: Jan. 12, 1999

[54] PROCESS FOR THE MANUFACTURE OF WIRES WITH A BRASS SURFACE, FOR THE PURPOSE OF WIRE ELECTROEROSION

[75] Inventor: Jean Paul Briffod, Lucinges, France

[73] Assignee: Charmilles Technologies SA, Switzerland

[21] Appl. No.: 762,455

[22] Filed: Dec. 9, 1996

[30] Foreign Application Priority Data

Dec. 11, 1995 [CH] Switzerland .......................... 03491/95

[51] Int. Cl.$^6$ ...................................... C21D 1/68
[52] U.S. Cl. .......................... 148/639; 148/679; 148/686; 148/687; 148/282; 427/406
[58] Field of Search .................................. 148/639, 679, 148/686, 687, 240, 282; 427/117, 120, 406; 428/658, 659; 219/69.12, 69.17

[56] References Cited

U.S. PATENT DOCUMENTS

| | | | |
|---|---|---|---|
| 4,924,050 | 5/1990 | Hermanni | 219/69.12 |
| 4,935,594 | 6/1990 | Groos et al. | 219/69.12 |
| 4,977,303 | 12/1990 | Briffod | 219/69.12 |
| 5,196,665 | 3/1993 | Briffod | 219/69.12 |

FOREIGN PATENT DOCUMENTS 526361 2/1993 European Pat. Off. .

*Primary Examiner*—Sikyin Ip
*Attorney, Agent, or Firm*—Gifford, Krass, Groh, Sprinkle, Patmore, Anderson & Citkowski, P.C.

[57] ABSTRACT

Copper wire coated with a layer of zinc is heated to a temperature ($T_1$) sufficient for the formation of a brass phase β, and the temperature is maintained until complete diffusion of the zinc. The thickness of the zinc covering can be chosen in such a way that once the zinc is completely diffused, the wire consists of a brass phase β in its periphery and of copper in its central part. The wire is then heated to a temperature ($T_2$) necessary for the formation of brass phase α, and the central copper part of the wire is transformed into brass phase α.

3 Claims, 2 Drawing Sheets

PROCESS FOR THE MANUFACTURE OF WIRES WITH A BRASS SURFACE, FOR THE PURPOSE OF WIRE ELECTROEROSION

FIELD OF THE INVENTION

The invention relates to a process allowing one to manufacture wires with a brass surface for the purpose of wire electroerosion.

BACKGROUND OF THE INVENTION

For wire electroerosion, one ordinarily uses brass wire whose structure and composition are suited for obtaining a wire which meets the needs arising with regard to mechanical breaking stress as well as conductivity. The manufacture of a brass wire corresponding to this type of alloy is relatively expensive. Added to this is the fact that for each variation in the chemical composition of the wire, it is necessary to devise a new base alloy.

SUMMARY OF THE INVENTION

Given these facts, the inventor proposed to devise a process as described above, allowing one to manufacture wire with a brass surface, if necessary, with a cross section with variable zinc content, at an advantageous price and in a simple manner.

The solution invented for this task is presented in this way: a copper wire coated with zinc is brought to a temperature sufficient for the formation of the brass phase β, and this temperature is maintained until complete diffusion of the zinc.

In order to avoid excessive evaporation of the zinc, it is recommended to limit the temperature necessary for formation of the brass phase β to 750° C.

The thickness of the coating can be chosen such that after complete diffusion of the zinc, the wire consists of the brass phase β over its entire cross section.

In comparison with the current techniques, the foremost advantage of the process of the invention lies in the simplicity with which it is possible to regulate and modify the zinc content over the cross section of the wire.

This allows one to adapt the properties of the surface of the wire to the conditions of operation of the electroerosion, while giving the core of the wire the necessary breaking strength. For this purpose, the zinc coating of the wire can be chosen to have a thickness such that once the zinc is completely diffused, the wire has a brass phase β on the periphery, with the core consisting of copper. By diffusion of the zinc from the brass phase β towards the central part, the central copper part can be transformed into brass phase α. To do this, once the peripheral part made of brass phase β and the central part made of copper is formed, it is necessary to heat the wire to a temperature sufficient for the formation of the brass phase α, preferably maintaining the heat at a temperature of at least 950° C. until the transformation by diffusion.

Since the second diffusion, namely the transformation by diffusion of copper into brass phase α, is relatively slow, a variant of the process of the invention consists of accelerating the transformation by local, short-duration raising of the temperature on the wire, with the effect of localized melting of the wire. One should take care to limit this melting zone to a length corresponding to 1 to 10 times the cross section of the wire, preferably choosing the value which is 5 times the cross section of the wire. The mechanical stability of the melted zone of the wire is maintained by the surface tension in the transition zone between the melted metal and the air.

The wire can be heated in the furnace in the form of a spool coil, making sure, however, that the spirals of wire are not contiguous in order to prevent any diffusion between them. One will preferably choose to heat the wire continuously, passing it through at least one heating installation, for example, a tunnel furnace or a heating pipe, or heating it by means of the direct flow of electrical current.

Other advantages, characteristics, and details of the invention will appear in the following descriptions of select examples of applications, as well as through the drawing which is included; this drawing represents schematically.

DETAILED DESCRIPTION OF THE PREFERRED EMBODIMENT

Figure 1:
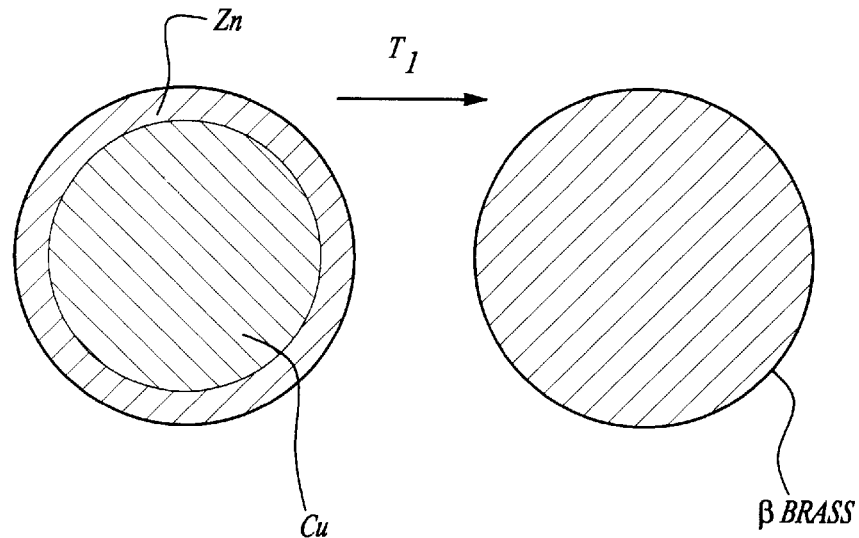
FIG. 1 is a cross sectional view of a zinc coated copper wire and a β phase brass wire.

FIG. 1 shows a copper wire coated with zinc. For a given thickness of the zinc cavity, the treatment at temperature $T_1$ of 750° C., for example, produces a wire made of brass phase β over its entire cross section, once the zinc is completely diffused.

Figure 2:
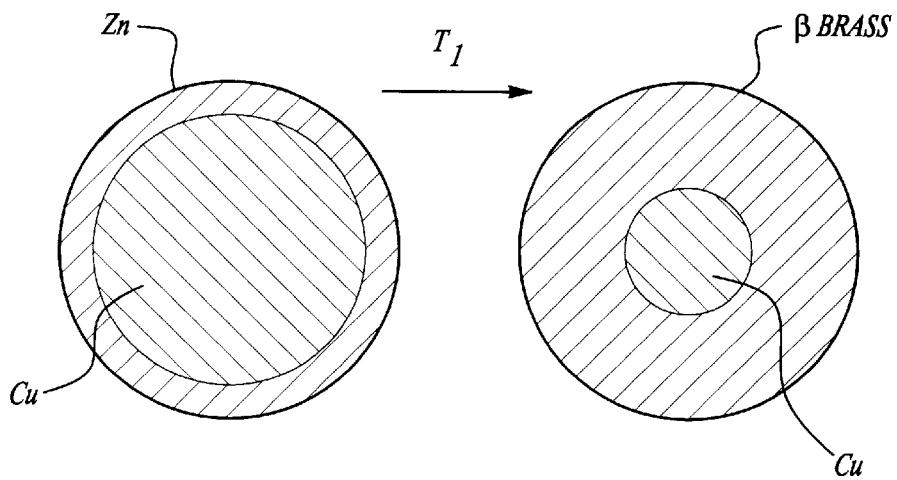
FIG. 2 is a cross sectional view of zinc coated copper wire and a wire with a β phase peripheral zone and a copper central part.
Figure 3:
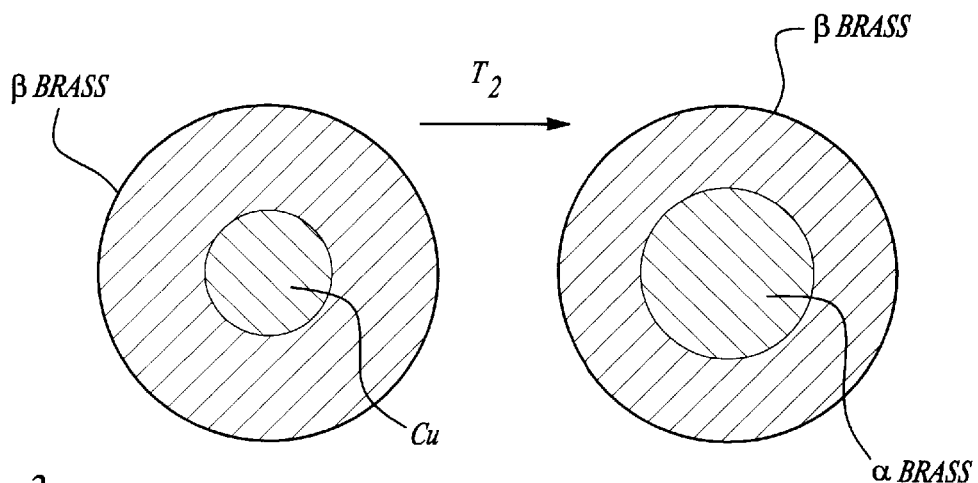
FIG. 3 is a cross sectional view of a wire with a β phase peripheral zone and a copper central part, and a wire with a brass phase α core and a brass phase β mantle.

In FIG. 2, the thickness of the zinc layer is smaller than in the example of FIG. 1. In this case, once the zinc is completely diffused, one obtains a peripheral zone of brass phase β, with a residual central part made of copper. In FIG. 3, this wire with two layers is then heated to a temperature $T_2$ of 950° C., for example. The copper is transformed by diffusion into brass phase α, which gives a wire whose core consists of brass phase α and a mantle of brass phase β.

Figure 4:
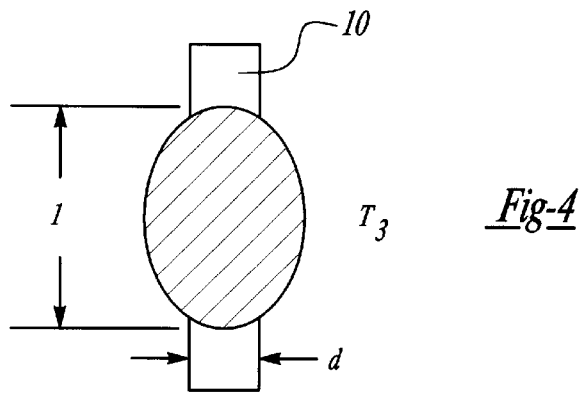
FIG. 4 is a cross sectional view of the part of a wire with local melting.

FIG. 4 shows the melting zone on the surface of a wire during its heating to temperature $T_3$ of 1100° C. which is higher than the melting temperature of copper (1083° C.). Length 1 of the melting zone on the surface is in this case a value five times greater than the cross section of the wire.

Figure 5:
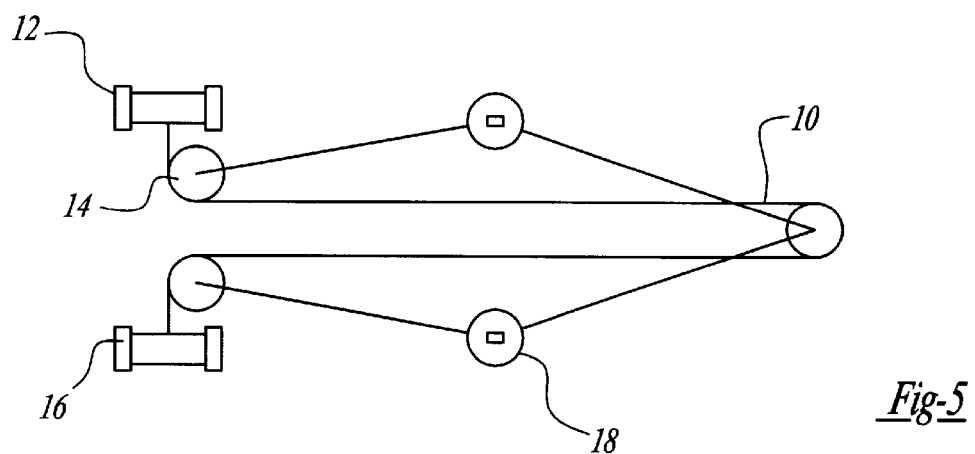
FIG. 5 is a diagram of the process for manufacturing a wire with one diffusion step.

FIG. 5 shows how a wire made of brass phase β is manufactured. Wire 10 is unwound from spool 12, passes through return rollers 14, and is finally wound onto spool 16. In the example given, the heat treatment occurs by means of an electrical flow passing through the wire supplied by electrical sources 18. They generate a voltage between the two juxtaposed return rollers 14, with the consequence of an electric current in the intermediate wire section. One thus obtains direct heating of wire 10.

Figure 6:
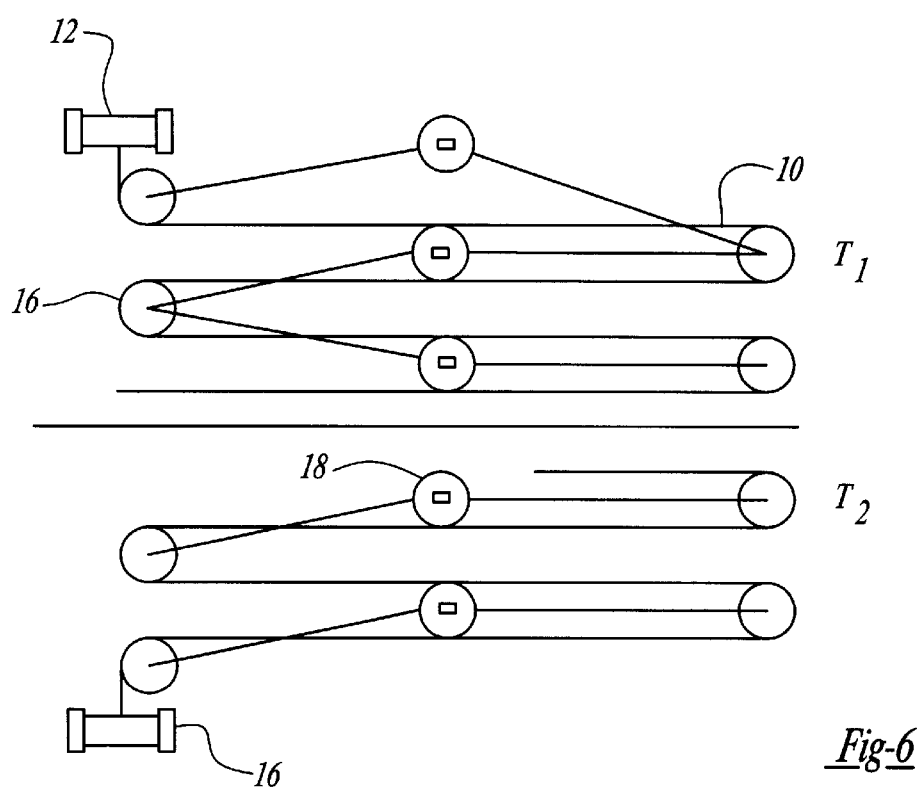
FIG. 6 is a diagram of the process for manufacturing a wire with two diffusion steps.

FIG. 6 shows a process with two consecutive diffusion steps for the purpose of manufacturing a wire with a central part made of brass phase α and an external mantle made of brass phase β. Since the transformation by diffusion of copper into brass phase α is much slower than for the preceding diffusion of copper, the time spent for a temperature $T_2$ of 950° C. is lengthened correspondingly by the use of a greater number of return rollers 14 in this range of temperature.

I claim:

1. A process for manufacturing of wires with a surface made of brass, for the purpose of wire electroerosion, the process comprising:

a. providing a copper wire covered with a layer of zinc having a thickness, the wire having a periphery and a central part;

b. heating the zinc covered copper wire to a temperature ($T_1$) sufficient for formation of brass phase β;

c. maintaining the zinc covered copper wire at the temperature ($T_1$) until the zinc has completely diffused;

wherein the thickness of the layer of zinc in step a is chosen so that when the zinc is completely diffused in step c, the periphery of the wire consists of brass phase β and the central part of the wire consists of copper d. heating the wire to a temperature ($T_2$) sufficient for formation of brass phase α;

e. maintaining the zinc covered copper wire at the temperature ($T_2$) until the central copper part of the wire is transformed by diffusion into brass phase α, wherein the transformation is accelerated by locally heating the wire for a short duration to a temperature ($T_3$) which is higher than the melting temperature of the copper.

2. The process according to claim 1, wherein the wire has a cross section (d) and is brought to the temperature ($T_3$) over a length (l), the length (l) being in the range of 1 to 10 times the cross section (d) of the wire.

3. The process according to claim 2, wherein the length (1) is 5 times the cross section (d) of the wire.

* * * * *